June 21, 1966 T. G. MYERS 3,256,590
METHOD OF ASSEMBLING A STATOR STRUCTURE
Original Filed Feb. 5, 1960
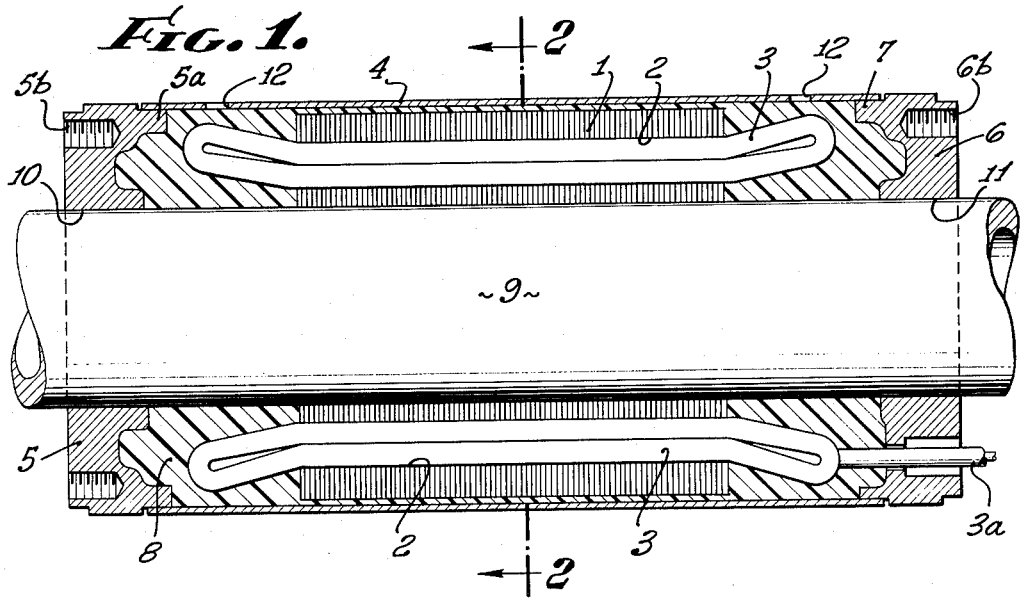
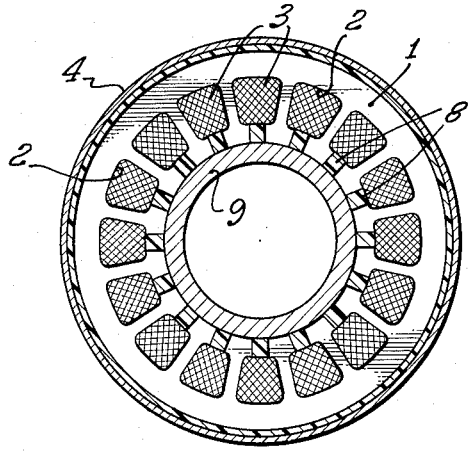
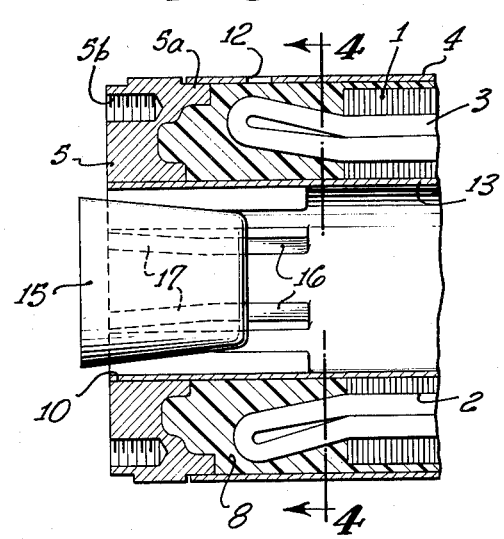
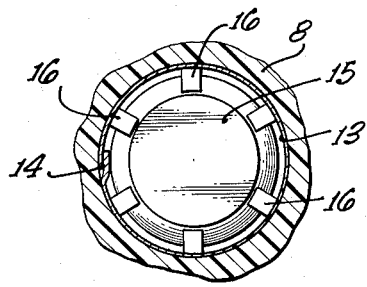
THOMAS G. MYERS
INVENTOR.
BY Flam and Flam
ATTORNEYS

3,256,590
METHOD OF ASSEMBLING A STATOR STRUCTURE

Thomas G. Myers, Los Angeles, Calif., assignor, by mesne assignments, to Emerson Electric Co., a corporation of Missouri
Continuation of abandoned application Ser. No. 7,024, Feb. 5, 1960. This application Nov. 4, 1963, Ser. No. 322,002
1 Claim. (Cl. 29—155.5)

This application is a continuation of my prior application Serial No. 7,024, filed Feb. 5, 1960, and entitled Stators for Submersible Motors, and Method of Making Same, and now abandoned.

This invention relates to dynamoelectric machinery, and particularly to stators for submersible electric motors.

Such stators are now quite commonly protected against entry of moisture to the stator windings by the aid of appropriate plastic material, such as an epoxy resin.

It is one of the objects of this invention to facilitate the manufacture of such completed stators.

It is another object of this invention to provide an improved stator structure and particularly by forming a substantially complete metallic casing around a stator structure that is embedded in a plastic material, and ensuring that the bearing brackets at each end of the casing will be substantially truly coaxial.

In motors of this character and in accordance with prior practice, the end brackets for the bearings must be machined so as to provide substantially perfect coaxiality for the shaft and the bore of the stator. Such locating fits are accordingly difficult to machine.

It is another object of this invention to obviate such expensive machining and, instead, to provide concentricity for the bearing bracket bores and the stator bore in a simple manner.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claim.

Referring to the drawings:

FIGURE 1 is a longitudinal sectional view of a stator structure incorporating the invention and also illustrating parts required for practicing the process of manufacturing the stator structure;

FIG. 2 is a sectional view, taken along a plane corresponding to line 2—2 of FIG. 1;

FIG. 3 is a fragmentary sectional view, similar to FIG. 1, of a modified form of the invention; and FIG. 4 is a sectional view, taken along a plane corresponding to line 4—4 of FIG. 3.

The stator structure of the form of FIGS. 1 and 2 includes a stack of laminations 1. The stator structure is provided with appropriate slots 2 in which the usual stator windings 3 are disposed.

This stack of laminations, with the windings 3, is placed in a frame or casing 4 of generally tubular configuration. This casing 4 may be made of any appropriate sheet material, such as stainless steel or the like, that can be effectively utilized in a well.

The casing 4 is provided with an end collar or cover 5 that may be appropriately joined to the left-hand end of the casing, as by the aid of flange 5a. At its other end, the casing 4 may be provided with a similar end collar 6 having a flange 7 telescoping into the casing 4, and appropriately attached thereto.

The winding 3 has lead 3a extending through an appropriate aperture in end collar 6. Both collars 5 and 6 are provided with appropriate means, such as threaded apertures 5b and 6b, for attaching bearing structures for the motor shaft.

Filling the casing 4 is cast plastic material 8. This cast plastic material extends through those portions of the slots not occupied by the windings 3, as well as between the interior diameter of the casing 4 and the exterior periphery of the stack 1. The stack 1 is purposely made of a smaller diameter than the internal diameter of casing 4 in order to render it unnecessary to provide an accurate fit between the stack of laminations 1 and the interior surface of the casing 4.

In order to provide a simple manufacturing process and for ensuring the centering of the stack 1 with respect to the casing 4, use is made of a mandrel 9. This mandrel 9 is utilized only during the process of manufacture. It accurately fits the apertures or bores 10 and 11 previously formed in the end collars 5 and 6. The diameter of the mandrel also fits the interior bore of the stack of laminations 1.

The first step in the process of manufacture is to assemble the mandrel 9 with the stack 1 within the casing 4 and the collars 5 and 6. After that, the cast plastic material is poured into the casing 4, as through one or more apertures 12 provided in the casing 4. The plastic, such as an epoxy resin, may be cured or hardened in any desired manner; and then the mandrel 9 may be removed.

After the mandrel 9 is removed, the stator bore will be substantially concentric with the locating fits defined by apertures 10 and 11. Finally, bearing brackets (not shown) may be provided in the conventional manner, properly supported on the collars 5 and 6.

By this method, true concentricity can be easily effected for all three cylindrical surfaces of apertures 10, 11 and of the stator bore. The apertures serve as locating fits for the bearing brackets mounted on collars 5 and 6. Laborious machining of locating fits is thus rendered unnecessary.

In the form shown in FIGS. 3 and 4, an expandible mandrel 13 is used instead of the mandrel 9 shown in connection with the first form. This mandrel 13 has overlapping edges indicated at 14 in FIG. 4.

In order to expand the mandrel so as to fill the apertures 10 and 11 of the collars 5 and 6, use is made of wedges 15 at each end of the mandrel 13. Each of the wedges cooperates with a plurality of bars 16 welded to the interior surface of the expandible mandrel 13, and having tapered surfaces 17 adapted to be engaged by the tapered surfaces of the wedges 15.

The wedge at the right-hand side of the stator is identical in construction with that shown in FIG. 3.

The inventor claims:

A process of assembling a stator structure for a dynamoelectric machine, comprising the steps of: assembling a stack of stator laminations and its winding in a hollow casing; providing end collars in cooperating engagement with said casing and having central coaxial cylindrical bores in alignment and being of substantially the same size as the bore of the stator stack; there being a substantial space between the outer periphery of the stack and the hollow casing; inserting through both end collar bores and said stator bore a hollow metal expandible mandrel of substantially cylindrical configuration;

supporting the stack of stator laminations by the aid of said mandrel and independently of the casing by inserting wedges into opposing ends thereof; holding the bore of the stator stack concentrically of the bores of said end collars by the aid of said mandrel; expanding the mandrel to fit the bores and the bore of the stack and to position the stator in spaced relation with said casing and thereby simultaneously define a cavity with the stator and its winding located between the casing, the mandrel, and said end collars; filling the cavity with fluent plastic material; setting the material; contracting the mandrel by removing said wedges after the material is set; and removing the contracted mandrel.

References Cited by the Examiner

UNITED STATES PATENTS

| | | | |
|---|---|---|---|
| 2,668,925 | 2/1954 | Bloser | 29—155.5 |
| 2,967,346 | 1/1961 | McMaster et al. | 29—155.5 |
| 3,084,418 | 4/1963 | Procopio | 29—155.5 |
| 3,165,816 | 1/1965 | Thompson et al. | 29—155.5 |

FOREIGN PATENTS 691,446   5/1953   Great Britain.

JOHN F. CAMPBELL, *Primary Examiner.*

J. W. BOCK, R. W. CHURCH, *Assistant Examiners.*